UNITED STATES PATENT OFFICE.

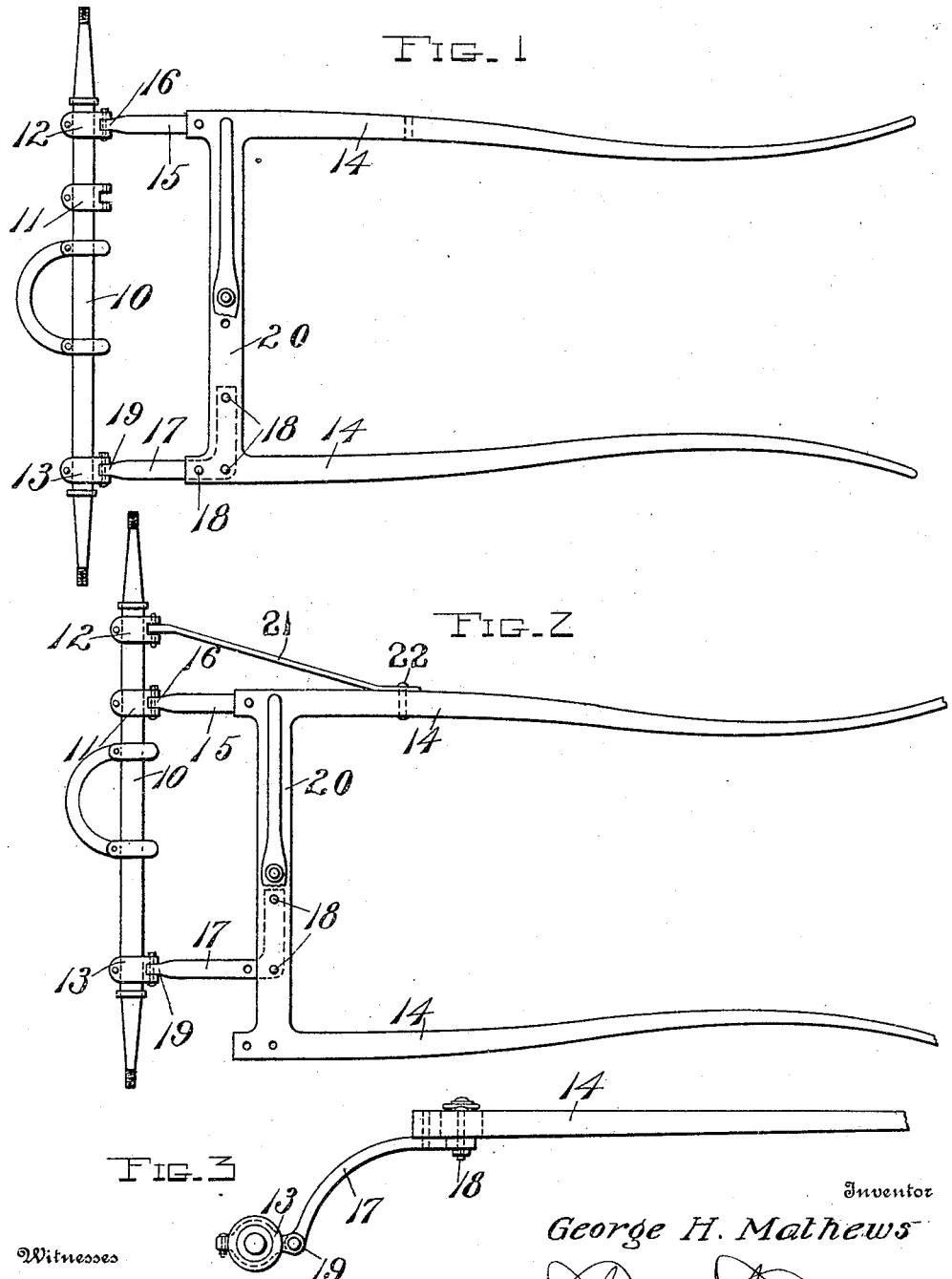

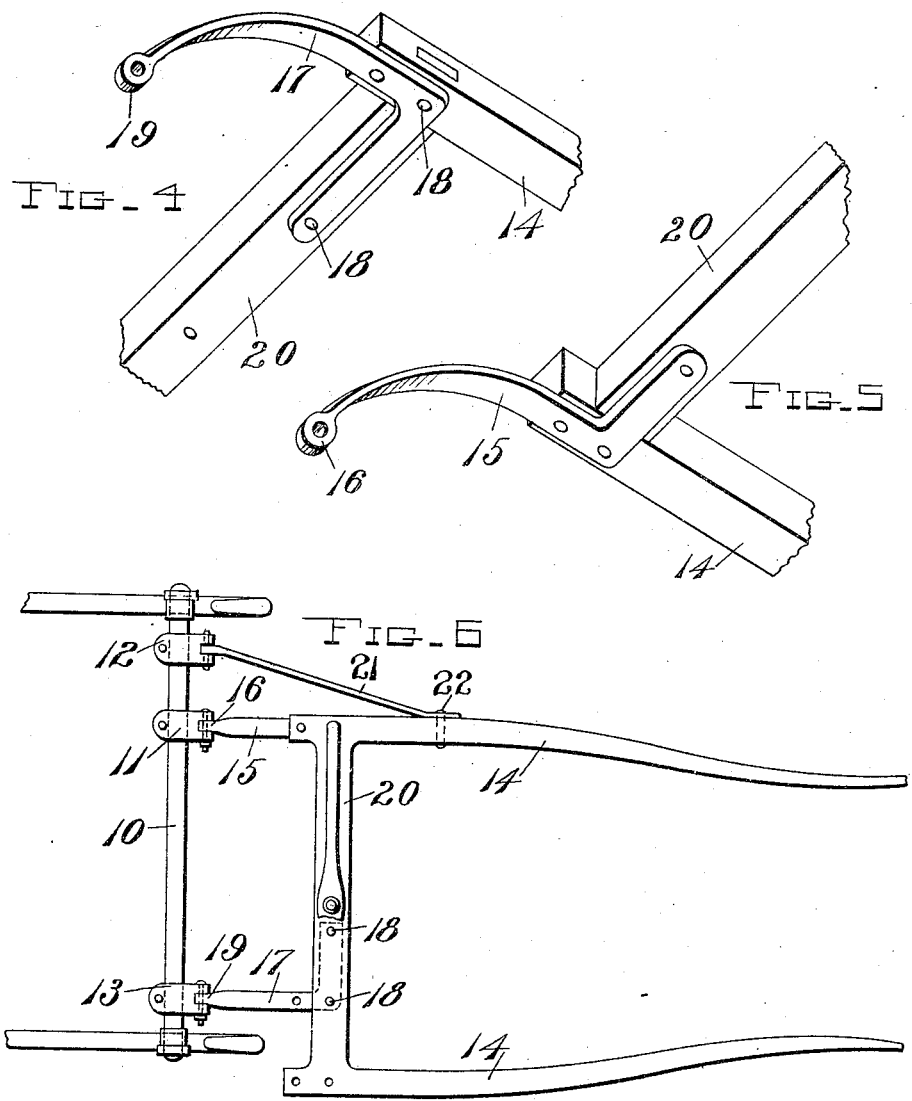

GEORGE H. MATHEWS, OF NEW MARKET, IOWA.

ADJUSTABLE VEHICLE THILLS.

No. 909,310.  Specification of Letters Patent.  Patented Jan. 12, 1909.

Application filed October 13, 1908. Serial No. 457,497.

*To all whom it may concern:*

Be it known that I, GEORGE H. MATHEWS, a citizen of the United States, residing at New Market, in the county of Taylor, State of Iowa, have invented certain new and useful Improvements in Adjustable Vehicle-Thills; and I do hereby declare the following to be a full, clear, and exact description of the invention, such as will enable others skilled in the art to which it appertains to make and use the same.

This invention relates to vehicle thills and has for one of its objects to provide a simply constructed attachment whereby a pair of thills may be adjusted laterally to enable the horse to travel in the rut of the road without creating side draft.

The invention further consists in an attachment whereby a pair of thills may be coupled centrally of the axle or other support or adjusted laterally to enable the horse to travel in the rut and without creating side draft.

With these and other objects in view the invention consists in an axle or other thill supporting element having thill clips near the ends and an auxiliary clip near one of the end clips, a stationary coupling means adapted to engage alternately with the auxiliary clip or the adjacent end clip, and a coupling adjustably connected to the thills and adapted to detachably engage with the other end clip.

The invention further consists in certain novel features of construction as hereafter shown and described and then specifically pointed out in the claims, and in the drawings illustrating the preferred embodiment of the invention.

Figure 1 is a plan view of the forward axle of a wheeled vehicle with the improvement applied centrally of the axle. Fig. 2 is a similar view with the thills arranged at one side of the center line of the axle. Fig. 3 is a side elevation of the device shown in Fig. 2. Fig. 4 is a detached perspective view of the adjustable coupling member. Fig. 5 is a detached perspective view of the stationary coupling member. Fig. 6 is a view similar to Fig. 2 showing the improved device applied to a sleigh.

Most of the roads in the country are worn by the wheels of vehicles in two depressions or ruts which in muddy weather or when the ground is soft wear to an inconvenient depth making it difficult to drive a single vehicle without arranging the thills at one side of the center line of draft so that the horse travels in one of the ruts, usually the right hand rut, but this necessitates two pairs of thills to each vehicle, when the vehicle is required for use both upon roads which do not have the spaced ruts, and also upon those that do.

The principal object of the present invention is to provide a simply constructed device whereby a pair of thills may be quickly changed from a position centrally of the vehicle, or at one side thereof, as required, and without changing the structure of the thills or of the vehicle.

The improved device may be readily applied to wheeled vehicles of all kinds as well as to sleighs and cutters, as shown.

When applied to wheeled vehicles the forward axle 10 is provided with an auxiliary clip 11 in addition to the usual end clips 12—13, whereby the thills represented as a whole at 14 are swingingly coupled to the axle, and the thills are provided at one side, usually the left side, with a stationary coupling member 15 having an eye at 16 to engage either in the end clip 12 or the auxiliary clip 11, as hereafter explained. At the other side of the thills a coupling member 17 is detachably connected to the thill 14 by bolts 18 or other suitable fastening means, and engages by an eye 19 with the clip 13.

The cross bar member 20 of the thill structure is provided with a plurality of spaced bolt holes to receive the bolts 18 when the coupling member is adjusted to the inner position as shown in Fig. 2, and when this is done the member 15 is coupled to the clip 11, as shown.

The member 17 is in L form with one arm bearing beneath the cross bar 20 to enable the member to be firmly coupled to the cross bar when in its inward position.

The improved device is simple in construction, can be inexpensively manufactured and applied to thills of various forms and to vehicles of various sizes and constructions.

A brace 21 will preferably be employed between the clips 12 and the adjacent thill 14, one end of the brace coupled to the clip 12 and the other end detachably connected to the thill by a bolt 22. By this means the brace can be readily detached when the device is arranged as shown in Fig. 1, and when the brace is not required. By this means the structure is materially strengthened and supported from lateral strains, as will be obvious.

What is claimed, is:—

1. The combination of a supporting member having thill engaging clips near the ends, an auxiliary clip carried by said supporting member and spaced from one of said end clips, a pair of thills, a coupling member connected permanently to said thills at one side and detachably engaging one of said end clips, and a coupling member adjustably connected to said thills at the other side and detachably engaging the other end clip, whereby said thills may be coupled centrally to said supporting member or coupled to said supporting member at one side of the center as required.

2. The combination of a supporting member having thill engaging clips near the ends, an auxiliary clip carried by said supporting member and spaced from one of said end clips, a pair of thills, a stationary coupling member carried by said thills at one side and detachably engaging one of said end clips, and a coupling member having a lateral extension and adapted to be adjustably connected to said thills at the other side and detachably engaging the other end clip.

3. The combination of a supporting member having thill engaging clips near the ends, an auxiliary clip carried by said supporting member and spaced from one of said end clips, a pair of thills, a stationary coupling member carried by said thills at one side and detachably engaging one of said end clips a coupling member having a lateral extension and adapted to be adjustably connected to said thills at the other side and detachably engaging the other end clip, and a brace detachably connected at one end to one of said end clips, and means for detachably coupling said brace at the other end to one of said thills.

In testimony whereof, I affix my signature, in presence of two witnesses.

GEORGE H. MATHEWS.

Witnesses:
H. E. TOMLINSON,
F. M. PETERMAN.